(12) United States Patent
Boom

(10) Patent No.: US 8,853,992 B2
(45) Date of Patent: Oct. 7, 2014

(54) METHOD AND CONVEYOR SYSTEM

(71) Applicant: Kone Corporation, Helsinki (FI)

(72) Inventor: Anthony S. Boom, Moline, IL (US)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 13/935,072

(22) Filed: Jul. 3, 2013

(65) Prior Publication Data

US 2013/0300339 A1 Nov. 14, 2013

Related U.S. Application Data

(63) Continuation of application No. PCT/US2011/055738, filed on Oct. 11, 2011.

(60) Provisional application No. 61/429,609, filed on Jan. 4, 2011.

(51) Int. Cl.
*H02P 23/02* (2006.01)
*B66B 25/00* (2006.01)

(52) U.S. Cl.
CPC ............... *H02P 23/02* (2013.01); *B66B 25/00* (2013.01)
USPC ........................... 318/812; 318/727; 318/767

(58) Field of Classification Search
CPC ...................................... H02P 23/02
USPC .......................................... 318/812, 727, 767
See application file for complete search history.

(56) References Cited

U.S. PATENT DOCUMENTS

| 4,482,853 | A | * | 11/1984 | Bhavsar | 318/778 |
|---|---|---|---|---|---|
| 4,748,394 | A | | 5/1988 | Watanabe | |
| 4,767,975 | A | * | 8/1988 | Unsworth | 318/729 |
| 4,859,924 | A | * | 8/1989 | Chonan | 318/808 |
| 5,099,977 | A | | 3/1992 | Hirose et al. | |
| 5,359,154 | A | * | 10/1994 | Tsukasa et al. | 177/145 |
| 6,781,342 | B2 | * | 8/2004 | Tolbert et al. | 318/784 |
| 2010/0327795 | A1 | | 12/2010 | Jahkonen | |

FOREIGN PATENT DOCUMENTS

| CN | 1498848 A | 5/2004 |
|---|---|---|
| CN | 101056085 A | 10/2007 |
| CN | 201190075 Y | 2/2009 |
| CN | 201415910 Y | 3/2010 |
| GB | 2175761 A | 12/1986 |

* cited by examiner

*Primary Examiner* — David Luo (74) *Attorney, Agent, or Firm* — Birch, Stewart, Kolasch & Birch, LLP (57) ABSTRACT

A conveyor system and a method for driving a conveyor are disclosed. In the method, electric power is supplied to the drive machinery of a conveyor depending on the power requirement with a supply device to be selected from at least two different adjustable supply devices, and the supply device supplying power to the drive machinery is changed on the basis of the power requirement of the conveyor.

26 Claims, 4 Drawing Sheets

METHOD AND CONVEYOR SYSTEM

CROSS-REFERENCE TO RELATED APPLICATIONS

This application is a Continuation of PCT International Application No. PCT/US2011/055738 filed on Oct. 11, 2011, which claims priority under 35 U.S.C 119(a) to U.S. Application No. 61/429,609 filed Jan. 4, 2011, all of which are hereby expressly incorporated by reference into the present application.

FIELD OF THE INVENTION

The invention relates to power supply solutions of conveyor systems and more particularly to power supply solutions of escalators, travelators and moving ramps.

BACKGROUND OF THE INVENTION

A conveyor comprises a track, along which a load is moved with the conveyor. The track of a conveyor has e.g. pallets, steps or corresponding to be moved, supported on which the load to be transferred, such as passengers or freight, is moved. Moving of the load occurs with drive machinery, which in addition to an electric motor can comprise e.g. a rotating gear wheel, which connects mechanically to the track of the conveyor, thus transmitting the force needed for moving the load. The power supply to the electric motor of the drive machinery normally occurs from an electricity network with a power supply apparatus, such as a frequency converter. The drive machinery with its power supply apparatus can be disposed e.g. in the end zone of the conveyor at the change-of-direction point of the track of the conveyor.

The power supply apparatus of the conveyor can be e.g. a frequency converter that returns electric power to the network. By means of the frequency converter the power to be supplied from the electricity network to the drive machinery of the conveyor, and thus also the running speed of the conveyor, can be adjusted steplessly. Since the power requirement of the conveyor is also proportional to the running speed of the conveyor, as well as to the load to be moved, by reducing the running speed of an idly running conveyor the energy consumption of the conveyor system can be minimized without this having a substantial effect on the transfer capacity of the conveyor. In this case when it is detected that the load of the conveyor is increasing, the running speed of the conveyor can be raised back to the normal operating speed of the conveyor. A problem with this solution is that the power-handling capacity of the frequency converter must be dimensioned according to the full load of the conveyor and according to the power requirement of the normal operating speed. In this case the size of the frequency converter as well as the size of the cooling apparatus needed increases to be quite large, in which case in addition to power losses and possible heat transfer problems, one problem is also the space in the conveyance system that needs to be reserved for the frequency converter/cooling apparatus.

Owing to the aforementioned reasons, inter alia, solutions have been developed wherein the electricity supply to the drive machinery of the conveyor occurs during heavy loading of the conveyor directly from the electricity network by connecting the phases of the network to the supply leads of the drive machinery with contactors. After the load of the conveyor has decreased, the contactors are opened and the power supply to the drive machinery of the conveyor is continued with the frequency converter, in which case the running speed of the conveyor and therefore the energy consumption of the conveyor can still be reduced with the frequency converter; the frequency converter to be used can in this case, however, be dimensioned for a significantly smaller power requirement, so that the size of the frequency converter/cooling apparatus decreases. One such solution is presented in publication U.S. Pat. No. 4,748,394.

Before the frequency-controlled drive machinery of a conveyor that operates at reduced speed can be connected to the electricity network with contactors, the running speed of the conveyor must first be increased to the normal operating speed and such that the frequency and phase of the current to be supplied to the drive machinery with the frequency converter can be synchronized with the network. Users of the conveyor will detect even a small synchronization error as a nudge or as a downright impact, which is transmitted from the drive machinery to the track of the conveyor in connection with the closing of the contactors.

A similar nudge is also detected if the amplitude of the voltage supplied by the frequency converter was smaller than the amplitude of the network voltage a moment before the closing of the contactors. In order to avoid this the amplitude of the supply voltage of the frequency converter can also be increased to near the amplitude of the network voltage for the purpose of synchronization with the network. Since synchronization with the network/increasing of the amplitude of the voltage supplied must, owing to the underdimensioned frequency converter, be performed before the loading of the conveyor has increased too much, from the moment of the closing of the contactors onwards the drive machinery of the conveyor operates at least for some time overexcited with an unnecessarily large voltage.

Overexcitation increases the current requirement of the drive machinery and at the same time also the energy consumption of the conveyor increases. On the other hand, the loading of the conveyor can vary to some extent also with heavy loading during normal operation of the conveyor, so that also during normal operation overexcitation increases the energy consumption of the conveyor.

AIM OF THE INVENTION

The aim of the invention is to provide a solution to the problem for reducing the dimensioning of the power supply apparatus of a conveyor while simultaneously optimizing the drive quality and energy consumption of the conveyor. To achieve this aim the invention discloses a method according to claim 1 and also a conveyor system according to claim 12.

The preferred embodiments of the invention are described in the dependent claims. Some inventive embodiments and inventive combinations of them are also presented in the descriptive section and in the drawings of the present application.

SUMMARY OF THE INVENTION

In the method according to the invention, for driving the conveyor electric power is supplied to the drive machinery of a conveyor depending on the power requirement with a supply device to be selected from at least two different adjustable supply devices, and the supply device to supply power to the drive machinery is changed on the basis of the power requirement of the conveyor. With the adjustable supply device according to the invention, at least one supply magnitude, such as current, voltage and/or supply power, can be adjusted. In this case during normal operation of the conveyor and with heavy loading a supply device, preferably a soft starter, can be used, in which the power supply is adjusted with switches, which are intended to be connected with a larger current and at a smaller switching frequency, preferably at the frequency of the electricity network. When the conveyor is running idle/with low loading, on the other hand, it is possible to use a supply device, preferably an inverter, the switches of which are intended to be connected with a smaller current and at a larger switching frequency. The inverter used does not in this case either need to be a regenerative braking type, but instead can be an inverter comprising a rectifying bridge formed from diodes. With this type of inverter power can be supplied just from the electricity network towards the drive machinery of the conveyor; however, an advantage of the inverter in question is inter alia a simple structure and a cheap price. As the power requirement of the conveyor and, on the other hand, the switching frequency of the switches increase, the power losses of the supply device also increase, so that by means of the solution according to the invention the power losses of the supply devices can be minimized, in which case also the size of the devices/necessary cooling apparatus decreases. Since in the invention power is supplied to the drive machinery of the conveyor with an adjustable supply device also during the normal operating speed of the conveyor and during essentially heavy loading, the overexcitation of the conveyor, and thus the energy consumption of the conveyor, can be reduced in all the operating situations of the conveyor, also during heavy loading.

In a preferred embodiment of the invention the amplitudes of the voltages to be supplied with the aforementioned at least two different adjustable supply devices are adjusted in the changeover situation of the supply device. In some embodiments the amplitudes at the fundamental frequencies of the voltages to be supplied with the aforementioned at least two different adjustable supply devices are adjusted to be essentially equal in the changeover situation of the supply device. In a preferred embodiment of the invention the supply device is changed when it is estimated that the power requirement of the conveyor will increase to be larger than the permitted power-handling capacity of the inverter. The permitted power-handling capacity of the inverter is determined on the basis of inter alia the current endurance of the power semiconductors of the inverter and/or the dimensioning of the cooling apparatus of the inverter. In a preferred embodiment of the invention the amplitude of the fundamental frequency of the voltage to be supplied with the soft starter is gradually increased in connection with a change of the supply device such that the amplitude of the supply voltage increases in a ramp towards the maximum value. In this way the change of the supply device can be performed smoothly without an undesirable torque impact or nudge being produced in the electric motor of the drive machinery.

In a preferred embodiment of the invention the power requirement of the conveyor is estimated and the supply device supplying power to the drive machinery is changed on the basis of the estimate made of the power requirement of the conveyor. The power requirement of the conveyor can be estimated e.g. with measuring devices that measure or forecast the number of passengers/amount of freight, said devices being disposed beside the route of the passengers/freight. The power requirement can also be estimated at different times of day, on certain dates or months on the basis of varying traffic intensity. The power requirement can also be estimated on the basis of one or more electrical magnitude, such as current, power, et cetera, of the drive machinery of the conveyor and/or of the supply devices of the conveyor.

In a preferred embodiment of the invention voltage adjustable in its amplitude and in its frequency is supplied to the drive machinery of the conveyor with an inverter during a period of an essentially small power requirement of the conveyor.

In a preferred embodiment of the invention voltage that is adjustable in its amplitude but of essentially constant frequency is supplied with the soft starter to the drive machinery of the conveyor from an alternating electricity source in a changeover situation of the supply device. In a preferred embodiment of the invention, before a change of a supply device the frequency of the inverter voltage is increased to be the same as the frequency of the alternating electricity source.

In some embodiments the frequency of the fundamental frequency of the voltage to be supplied with the inverter is adjusted to be just as large as the frequency of the fundamental frequency of the voltage to be supplied with the soft starter in the changeover situation of the supply device and also the phase of the fundamental frequency of the voltage to be supplied to the drive machinery with the inverter is adjusted to be essentially the same as the phase of the fundamental frequency of the voltage to be supplied to the drive machinery with the soft starter in the changeover situation of the supply device. In this way the accuracy of the synchronization of the supply voltages can be further improved in the changeover situation of the supply device.

In a preferred embodiment of the invention voltage of the same frequency as the frequency of the alternating electricity source is supplied with the soft starter to the drive machinery of the conveyor.

In a preferred embodiment of the invention voltage is supplied to the drive machinery of the conveyor with the soft starter when the power requirement of the conveyor is greater than the upper limit of the permitted power-handling capacity of the inverter.

The conveyor system according to the invention comprises drive machinery for driving the conveyor. The conveyor system also comprises at least two different, adjustable supply devices, fitted to supply electric power at different times to the drive machinery of the conveyor. In addition, the conveyor system comprises a control device, which is configured to form a control signal for changing the supply device supplying power to the drive machinery on the basis of the power requirement of the conveyor. In a preferred embodiment of the invention the aforementioned at least two different adjustable supply devices are arranged to adjust the amplitudes of the voltages they supply in the changeover situation of the supply device. In some embodiments of the invention the aforementioned at least two different adjustable supply devices are arranged to adjust the amplitudes of the fundamental frequencies of the voltages they supply in the changeover situation of the supply device to be essentially equal. One supply device according to the invention is an inverter; another supply device according to the invention is a soft starter. In a preferred embodiment of the invention the soft starter is configured to gradually increase the amplitude of the voltage to be supplied with the soft starter in connection with a change of the supply device. The soft starter is intended to be connected with a larger current and with a smaller switching frequency than the inverter. The inverter is used when running the conveyor on idle/with low loading and the soft starter is used during a period of heavy loading of the conveyor. In a preferred embodiment of the invention the inverter is fitted to supply voltage to the supply leads of the drive machinery of the conveyor, the amplitude and frequency of the fundamental frequency of which voltage are adjustable. In a preferred embodiment of the invention the soft starter comprises thyristors fitted between the alternating electricity source and the drive machinery such that at least one thyristor is in each phase connected in series between a phase of the alternating electricity source and a phase conductor of the drive machinery. Since the power losses of the thyristors are generally smaller, owing inter alia to a lower switching frequency as well as to the structural properties of the thyristors, than power semiconductors (such as IGBT transistors or MOSFET transistors) of corresponding size used in the switches of the inverter, the power losses of the supply devices can be minimized by means of the combination according to the invention of thyristors and an inverter, in which case also the size of the devices/necessary cooling apparatus decreases. Since in the invention the amplitude of the voltage to be supplied to the drive machinery of the conveyor can be adjusted with the soft starter also during the normal operating speed of the conveyor and during essentially heavy loading, the overexcitation of the conveyor, and thus the energy consumption of the conveyor, can be reduced in all the operating situations of the conveyor, also during heavy loading.

In a preferred embodiment of the invention the conveyor system comprises means for estimating the power requirement of the conveyor, and the control device is configured to form a control signal for changing the supply device supplying power to the drive machinery on the basis of the estimate made of the power requirement of the conveyor. The means for estimating the power requirement of the conveyor can comprise e.g. means for estimating the amount of passengers using the conveyor and/or freight to be transferred with the conveyor.

The means can therefore comprise e.g. sensors that measure or forecast the amount of passengers and/or freight, said sensors being placed beside the arrival route of the passengers/freight, such as proximity sensors based on an electromagnetic measuring signal, such as photoelectric cells, etc. The means for estimating the power requirement of the conveyor can also comprise e.g. sensors that measure the current/supply power of the drive machinery of the conveyor; on the other hand, the aforementioned means can also be implemented with a software program, e.g. as a table stored in the memory of the control unit of the conveyor, which program can express the times (times of day, dates, etc.) when the use of the conveyor is more intensive. In this case the supply device can be already selected beforehand to supply greater power to the drive machinery of the conveyor during times of busy traffic, and the conveyor can be used at other times primarily at a smaller running speed and smaller supply power.

In a preferred embodiment of the invention the conveyor system comprises an inverter, for which an upper limit for permitted power-handling capacity is defined. The inverter is fitted between the alternating electricity source and the supply leads of the drive machinery. In a preferred embodiment of the invention the inverter is fitted to supply voltage adjustable in its amplitude and in its frequency to the supply leads of the drive machinery of the conveyor.

In a preferred embodiment of the invention the conveyor system also comprises a soft starter, which is fitted between the alternating electricity source and the supply leads of the drive machinery. The soft starter is fitted in parallel with the inverter to form between the alternating electricity source and the supply leads of the drive machinery a second current pathway in parallel with the current pathway of the inverter. The control device is configured to form a control signal for changing the supply device supplying power to the drive machinery from the inverter to the soft starter, or from the soft starter to the inverter, on the basis of the estimate made of the power requirement of the conveyor. The alternating electricity source according to the invention can be e.g. an electricity network or a reserve power generator.

In a preferred embodiment of the invention the control device is configured to form a control signal for changing the supply device supplying power to the drive machinery from the inverter to the soft starter when it is estimated that the power requirement of the conveyor will increase to be larger than the permitted power-handling capacity of the inverter. In a preferred embodiment of the invention the control device is configured to form a control signal for changing the supply device supply power to the drive machinery from the soft starter to the inverter after the power requirement of the conveyor has decreased to be according to the permitted power-handling capacity of the inverter. When the power required by the drive machinery of the conveyor is supplied during large loading of the conveyor from the alternating electricity source with a soft starter, the inverter can be dimensioned for a smaller current endurance and power handling capacity. The power requirement of the conveyor when idling comprises mainly only the friction losses of motion, and the power requirement is in this case often only approx. 5 percent of the power requirement of the full loading. That being the case, dimensioning of the inverter for idling or otherwise for a loading essentially smaller than a full load essentially reduces also the dimensioning of the main circuit of the inverter. The inverter does not in this case either need to be a regenerative braking type, but instead the inverter can comprise a diode bridge for supplying electricity from the alternating electricity source to the direct-current intermediate circuit of the inverter.

In a preferred embodiment of the invention the soft starter is fitted to supply voltage that is adjustable in its amplitude but of essentially constant frequency from the alternating electricity source to the supply leads of the drive machinery of the conveyor. Consequently the amplitude of the supply voltage of the drive machinery of the conveyor can be adjusted on the basis of the power requirement of the conveyor when the loading of the conveyor varies also during essentially heavy loading. When the power requirement/loading of a conveyor varies, too large an amplitude of the supply voltage of the drive machinery produces an unnecessarily large excitation current of the motor. Growth of the excitation current on the other hand increases the power losses of the motor, e.g. in the form of line losses and eddy current losses.

In some embodiments of the invention the thyristors of the soft starter are fitted between the alternating electricity source and the drive machinery such that two thyristors connected in antiparallel with each other are connected to each phase between a phase of the alternating electricity source and a phase conductor of the drive machinery to form a current pathway between the phase of the alternating electricity source and the phase conductor of the drive machinery.

In some embodiments the soft starter comprises TRIACs (bidirectional diode thyristors). The TRIACs are fitted between the alternating electricity source and the drive machinery such that a TRIAC is connected to each phase in series between a phase of the alternating electricity source and a phase conductor of the drive machinery to form a current pathway between the phase of the alternating electricity source and the phase conductor of the drive machinery.

The conveyor system according to the invention can be e.g. an escalator, a travelator or a moving ramp. In a conveyor system according to the invention, a load, such as passengers, freight or raw materials, is moved along the track of the conveyor.

The aforementioned summary, as well as the additional features and advantages of the invention presented below, will be better understood by the aid of the following description of some embodiments, said description not limiting the scope of application of the invention.

BRIEF EXPLANATION OF THE FIGURES

In the following, the invention will be described in more detail by the aid of some examples of its embodiments with reference to the attached figures, wherein.

MORE DETAILED DESCRIPTION OF PREFERRED EMBODIMENTS OF THE INVENTION

Figure 1:
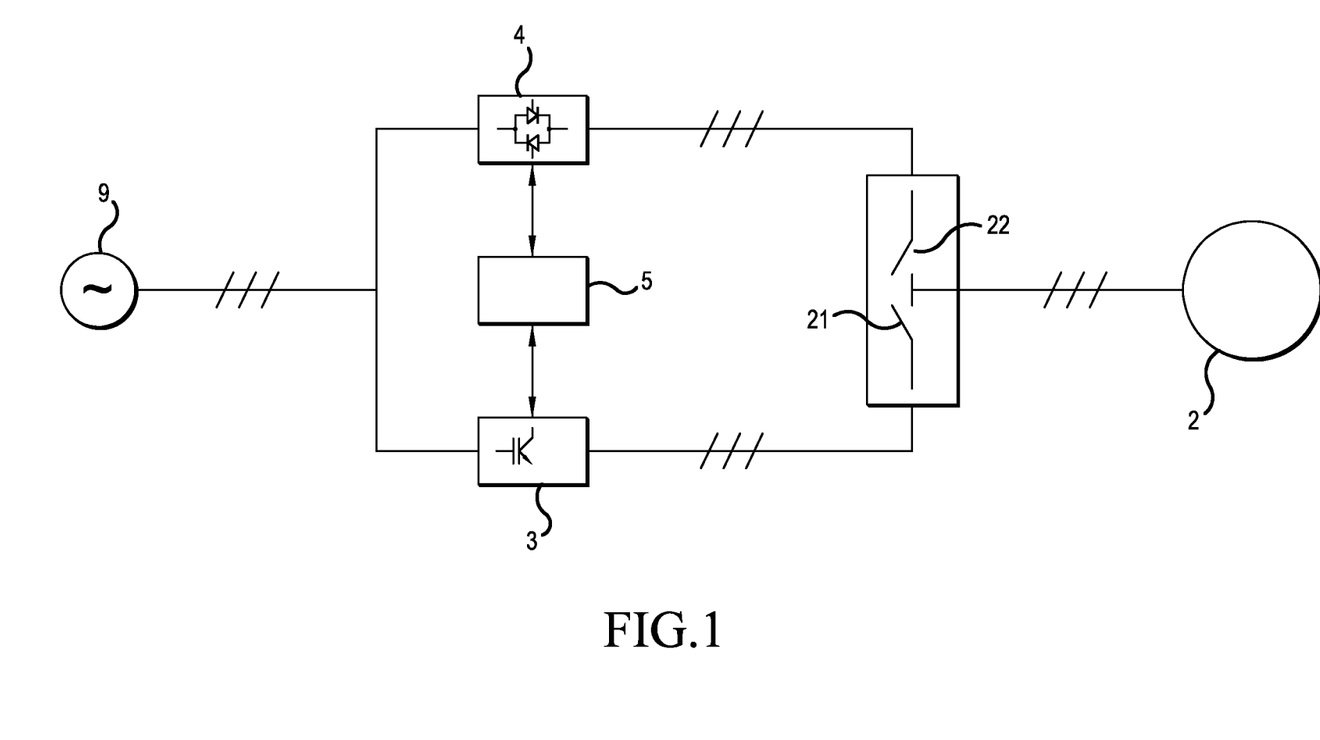
FIG. 1 presents as a block diagram one power supply apparatus according to the invention

As presented in FIG. 1, the power supply to the induction motor that functions as the power-producing part of the drive machinery 2 of the conveyor occurs alternatively either with an inverter 3 or with a soft starter 4. The inverter 3 is used when the power requirement of the conveyor is small, such as when the conveyor is running idle, and the soft starter 4 is used during a period of a large power requirement of the conveyor. Power is supplied to the stator winding of the induction motor, which stator winding has a delta connection.

Figure 2A:
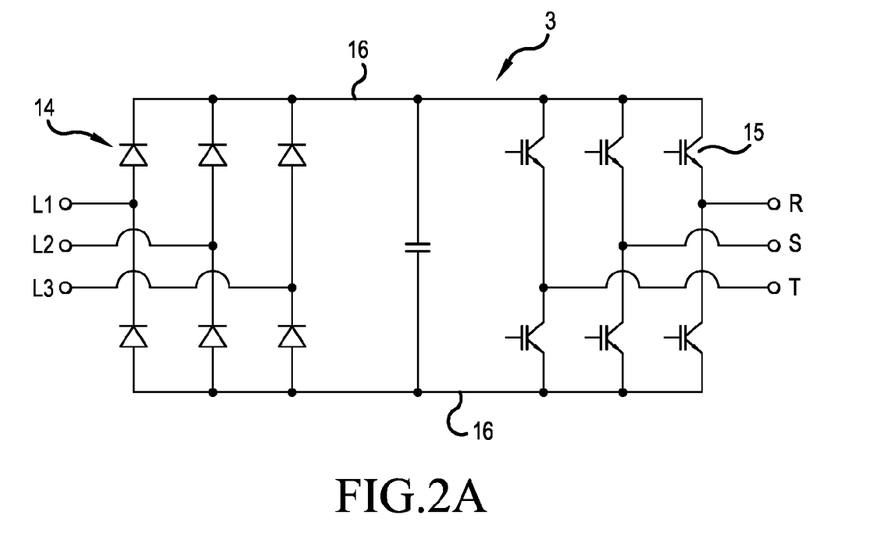
FIG. 2a presents one inverter according to the invention
Figure 2B:
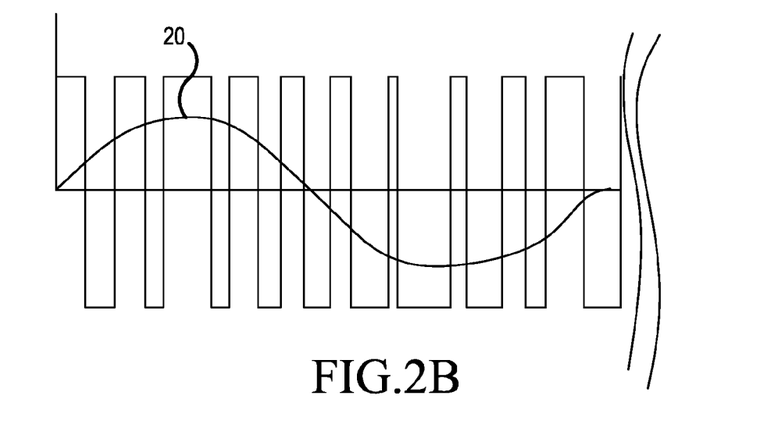
FIG. 2b presents a graph of the supply voltage of an inverter according to FIG. 2a FIG. 3a presents one soft starter according to the invention

FIG. 2a presents in more detail an inverter to be used in the embodiment of FIG. 1. The inverter 3 comprises a rectifying bridge 14, which is implemented with diodes, to be connected to the phases L1, L2, L3 of a three-phase electricity network 9. In addition, the inverter 3 comprises a motor bridge 15, which is implemented with IGBT transistors, to be connected to the supply leads R, S, T of the three-phase induction motor of the drive machinery 2. The rectifying bridge 14 and the motor bridge 15 are connected to each other with a direct-current intermediate circuit 16. The IGBT transistors of the motor bridge are switched with modulation, preferably with pulse width modulation, such that a supply lead of the motor is connected in turn to the positive and to the negative voltage potential of the DC intermediate circuit 16, in which case the amplitude and frequency of the fundamental frequency 20 of the supply voltage can be adjusted steplessly (FIG. 2b).

Figure 3A:
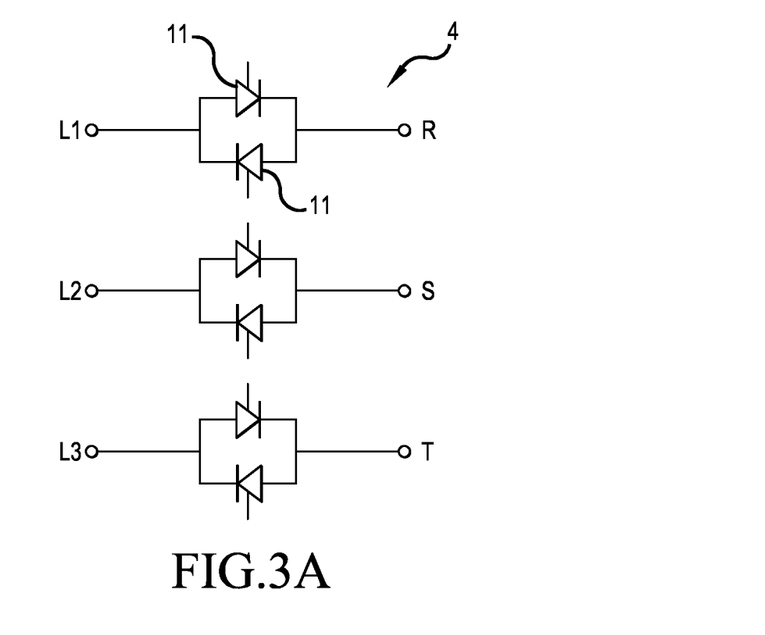

The soft starter 4 is fitted in parallel with the inverter 3 to form between the electricity network 9 and the supply leads of the induction motor of the drive machinery 2 a second current pathway in parallel with the current pathway of the inverter 3. FIG. 3a presents in more detail a soft starter 4 to be used in the embodiment of FIG. 1. The soft starter 4 comprises thyristors 11 fitted between the electricity network 9 and the drive machinery 2 such that between each phase L1, L2, L3 of the electricity network 9 and each phase conductor R, S, T of the drive machinery 2 two thyristors 11 connected in antiparallel are connected.

Figure 3B:
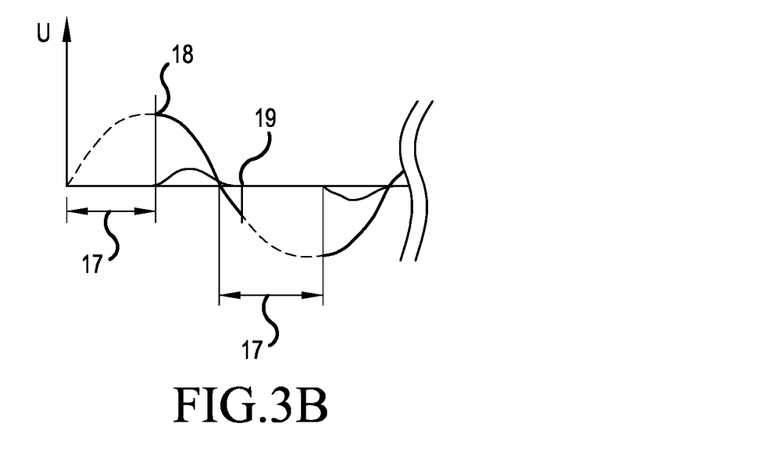
FIG. 3b presents a graph of the supply voltage of a soft starter according to FIG. 3a FIG. 4 presents one escalator according to the invention

Voltage of the same frequency as the frequency of the network voltage, but the amplitude of which supply voltage is adjustable, is supplied with the soft starter 4. FIG. 3b presents a graph of the supply voltage of one soft starter. The amplitude of the voltage of the soft starter can be adjusted by adjusting the firing angle 17 of the thyristors 11. The thyristor 11 is triggered into conduction at the moment 18 by supplying current pulses to the gate of the thyristor 11.

At the moment of firing the voltage difference from the anode to the cathode of the thyristor is positive. After being triggered the thyristor 11 conducts until the flow of current through the thyristor ceases (at the moment 19). Therefore the amplitude of the supply voltage of the soft starter 4 can be reduced by increasing the firing angle 17 and can also be increased by reducing the firing angle 17.

The controls of the inverter 3 and of the soft starter 4 are synchronized with each other such that the power supply from the inverter 3 to the induction motor of the drive machinery 2 is disconnected a moment before power supply with the soft starter 4 is started.

Correspondingly, the power supply from the soft starter 4 to the induction motor of the drive machinery 2 is disconnected a moment before power supply with the inverter 3 is started.

Disconnection of the power supply of the inverter 3 occurs by controlling the switches of the motor bridge of the inverter 3 open. In this embodiment of the invention the power supply apparatus of the drive machinery 2 comprises separate contactors, with the first 21 of which the output of the inverter 3 is connected to the power supply circuit of the drive machinery 2 or isolated from the power supply circuit of the drive machinery 2 and with the second 22 of which contactors the output of the soft starter 4 is connected to the power supply circuit of the drive machinery 2 or isolated from the power supply circuit of the drive machinery.

The control unit 5 receives information about the power requirement of the conveyor and, when it detects that the power requirement of the conveyor has changed, forms a control signal, on the basis of which the supply device 3, 4 supplying power to the electric motor of the drive machinery 2 is changed.

Before the supply device is changed, the speed of the conveyor is adjusted to the normal operating speed of the conveyor. In addition, the supply voltages of the supply devices 3, 4 are synchronized with each other such that the change of supply device does not cause a nudge or impact to the drive machinery 2, which nudge or impact might be transmitted from the drive machinery onwards to the track of the conveyor. In practice this synchronization occurs by adjusting the frequency of the fundamental frequency of the supply voltage of the inverter 3 in connection with the adjustment of the speed of the conveyor to be essentially as large as the frequency of the fundamental frequency of the supply voltage of the soft starter 4, i.e. to the frequency of the supply network. In addition, the amplitudes of the fundamental frequencies of the supply voltages of the inverter 3 and of the soft starter 4 are selected in the changeover situation of the supply device such that the aforementioned nudge or impact will not occur. In practice this occurs as follows: when a decrease in the power requirement of the conveyor is detected, e.g. when it is detected that the current of the drive machinery 2 has decreased to the permitted power-handling capacity of the inverter 3, the control unit 5 forms a signal for switching the conveyor to an idling state. In this case the soft starter 4 stops the power supply to the electric motor of the drive machinery 2 and the contact of the contactor 22 opens, isolating the output of the soft starter 4 from the power supply circuit of the drive machinery 2, in which case the motor current starts to decrease. After a short time delay the contact of the contactor 21 closes, connecting the output of the inverter 3 to the power supply circuit of the drive machinery 2. After this the inverter continues the power supply to the induction motor of the drive machinery 2. The frequency of the fundamental frequency of the supply voltage of the inverter is in this case selected to be near the frequency of the network voltage, at which frequency the soft starter 4 a moment earlier supplied voltage to the induction motor. The amplitude of the fundamental frequency of the supply voltage of the inverter 3, on the other hand, is selected on the basis of the electrical parameters of the induction motor to correspond to the voltage requirement of the induction motor at the operating point of the motor in question.

Figure 5:
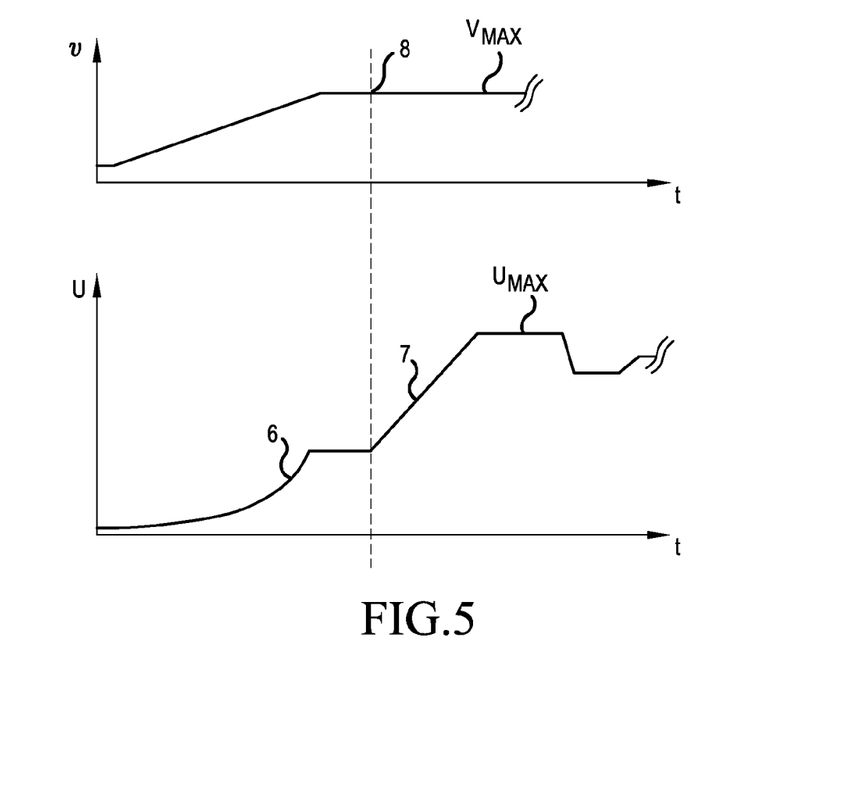
FIG. 5 presents the speed of the conveyor as a function of time when switching from idling speed to the normal operating speed of the conveyor and also the amplitudes of the supply voltages of different supply devices as a function of time in connection with a change of the supply device of the conveyor

The inverter gradually reduces the frequency of the supply voltage of the induction motor such that the speed of the conveyor decreases to idling speed. The inverter 3 continues the run at idling speed until the control unit 5 detects that the power requirement of the conveyor starts to increase again. In this case the control unit 5 forms a control signal for switching the conveyor into normal operating state. FIG. 5 illustrates the switch of state from the idling state to the normal operating state as a function of time. In response to the control signal the inverter 3 accelerates the speed v of the conveyor gradually back to the normal operating speed $v_{max}$ of the conveyor, after which at the moment 8 the inverter stops the power supply to the drive machinery 2 and the output of the inverter 3 is isolated from the power supply circuit of the induction motor of the drive machinery 2 by opening the contact of the contactor 21. Immediately after this the soft starter 4 is connected to the power supply circuit of the induction motor by closing the contact of the contactor 22 and the soft starter 4 starts to supply power to the drive machinery 2. The amplitude 7 of the supply voltage of the soft starter 4 is immediately after the moment of change 8 of essentially the same magnitude as the supply voltage 6 of the inverter a moment before the moment of change 8. The soft starter gradually increases the amplitude 7 of the supply voltage of the induction motor of the drive machinery towards the maximum value $U_{max}$ by adjusting the control angle of the thyristors 11 such that the change of the power supply apparatus does not cause the same type of nudge or impact to the induction motor of the drive machinery that would be caused by a large step-like change in the amplitude of the supply voltage.

Since in the invention the amplitude of the voltage to be supplied to the drive machinery 2 of the conveyor can be adjusted with the soft starter 4 also during the normal operating speed of the conveyor and during essentially heavy loading, the overexcitation of the conveyor, and thus the energy consumption of the conveyor, can be reduced in all the operating situations of the conveyor, also during heavy loading (FIG. 5).

In one embodiment of the invention the inverter is implemented as a matrix converter that is, per se, known in the art, the switches of which matrix converter are arranged as a switch matrix, with which each of the different phases of the electricity network can be connected in a controlled manner to each phase of the electric motor of the drive machinery 2 for forming variable amplitude and variable frequency supply voltage.

Figure 4:
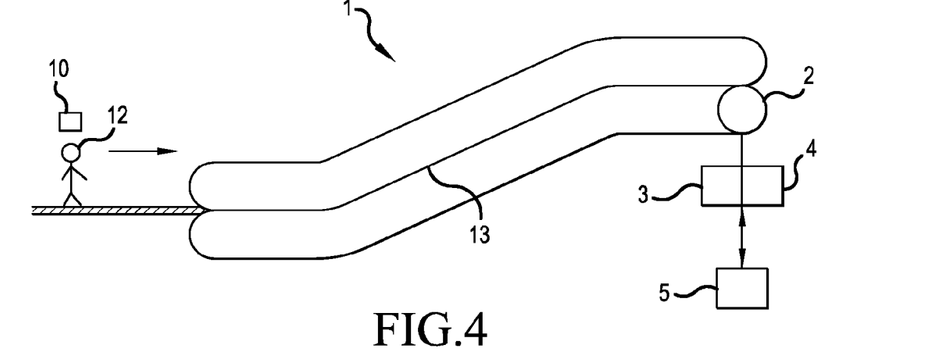

The escalator system of FIG. 4 is arranged to move the arriving passengers 12 in the direction of the arrow to an upper exit level. The drive machinery 2 of the escalator system is disposed in the end zone at the point of the change of direction of the escalator 1. The drive machinery 2 comprises an induction motor as the power-producing part, with which induction motor the driving force that moves the step chain of the escalator is produced. The force is transmitted from the induction motor to the steps of the escalator 1 with transmission means, such as with gearing, a gear wheel, et cetera, the structure and operation of which transmission means are prior art in their basic principles, and are not presented in this context in more detail.

Power is supplied to the induction motor of the drive machinery of the escalator 1 using the power supply apparatus according to the embodiment of FIG. 1. The supply device to supply power to the induction motor at any given time is selected on the basis of the power requirement of the escalator such that power is supplied to the induction motor with the inverter 3 during a period of an essentially small power requirement of the escalator 1 and power is supplied to the induction motor with the soft starter 4 when the power requirement of the escalator has increased to be larger than the permitted power-handling capacity of the inverter 3. When the escalator is running idle the running speed of the escalator is also adjusted with the inverter 3 to the reduced idling speed in order to minimize energy consumption. The maximum permitted power-handling capacity of the inverter 3 is determined on the basis of the dimensioning of the inverter 3, such as on the basis of the dimensioning of the power semiconductors, as well as on the basis of the dimensioning of the cooling. Before the supply device is changed from the inverter 3 to the soft starter 4 the supply voltages of the supply devices 3, 4 are synchronized in the manner presented in the embodiment of FIG. 1. Also the speed of the escalator 1 is increased with the inverter 3 from idling speed back to the normal operating speed before a change of the supply device. To be able to increase the running speed of the escalator 1 to the normal operating speed before the loading of the escalator has increased to over the maximum permitted power-handling capacity of the inverter, it must be possible in some way to forecast any change in the loading of the escalator. For this reason in connection with the escalator system proximity sensors 10 are fitted to the arrival route of passengers, which sensors sense the presence of passengers/freight and consequently forecast the traffic flow arriving at the escalator 1. The proximity sensors 10 are connected to the control unit 5 of the escalator such that when detecting the approach of passengers/freight the control unit 5 forms a control signal, in response to which the inverter 3 increases the speed of the escalator 1 to the normal operating speed, after which the power supply to the drive machinery 2 of the escalator is changed so that it occurs from the soft starter 4.

The power requirement of the escalator can be estimated e.g. such that with the proximity sensor 10 the number of those passengers that within a certain time travel past the proximity sensor 10 towards the escalator 1 is measured. When the aforementioned number of passengers per unit of time has exceeded the set first limit value, the speed of the escalator is increased to the normal operating speed and the power supply is controlled to occur from the soft starter 4 in the manner described above. When the number of passengers per unit of time again falls below a second limit value that is smaller than the first, the power supply of the motor is continued with the inverter 3 after it is detected that the power requirement of the escalator 1 has decreased to be in accordance with the permitted power-handling capacity of the inverter 3. In practice this can be done e.g. by measuring the current to be supplied to the drive machinery 2, in which case a decrease of the current reveals a decrease in the power requirement of the escalator 1.

In addition to, or instead of, the proximity sensors, for example a photoelectric cell can be used for detecting passengers, which cell measures the presence of a passenger/freight on the track 13 of the escalator 1. The power requirement of the escalator 1 can also be determined or forecast by measuring the current or the supply power of the electric motor of the drive machinery 2. Therefore, for example, on the basis of an increase in the current of the drive machinery 2 it can be estimated that the power requirement of the escalator 1 is increasing. If the operating direction of the escalator 1 is turned, such that the passengers 12 start to be moved from a higher entrance level to a lower exit level, the motor of the drive machinery 2 of the escalator starts to brake, returning power to the electricity network. Power return from the electric motor of the drive machinery 2 to the electricity network occurs with the soft starter 4.

In the escalator system described above the escalator is driven with only one drive machinery 2. The escalator system can, however, also comprise a number of drive machineries 2, which can be disposed either in the end zone or on a sloping section of the track between the end zones. In this case the drive machineries can be connected in parallel with each other and the power supply apparatuses 3, 4 can be fitted to supply power simultaneously to the different drive machineries that are connected in parallel; on the other hand, different drive machineries can also have separate power supply apparatuses 3, 4.

The invention is not only limited to be applied to the embodiments described above, but instead many variations are possible within the scope of the inventive concept defined by the claims below.

The invention claimed is:

1. A method for driving a conveyor, said method comprising the steps of:
    supplying electric power to drive machinery of the conveyor depending on the power requirement of the conveyor with a supply device to be selected from at least two different adjustable supply devices, the at least two different adjustable supply devices including an inverter and a soft starter; and
    changing the supply device supplying power to the drive machinery on the basis of the power requirement of the conveyor,
    wherein supplying electric power to drive machinery of the conveyor with the inverter is performed during a first period, and supplying electric power to drive machinery of the conveyor with the soft starter is performed during a second period, a power requirement of the conveyor during the first period being smaller than a power requirement of the conveyor during the second period.

2. The method according to claim 1, further comprising the steps of:
    estimating the power requirement of the conveyor; and
    changing the supply device supplying power to the drive machinery on the basis of the estimate made of the power requirement of the conveyor.

3. The method according to claim 1, further comprising the step of:
    adjusting the amplitudes of the voltages to be supplied with the at least two different adjustable supply devices in the changeover situation of the supply device.

4. The method according to claim 1, further comprising the step of:
    adjusting the amplitudes at the fundamental frequencies of the voltages to be supplied with the at least two different adjustable supply devices to be essentially equal in the changeover situation of the supply device.

5. The method according to claim 1, further comprising the step of:
    supplying voltage adjustable in its amplitude and in its frequency to the drive machinery of the conveyor with the inverter during a period of an essentially small power requirement of the conveyor.

6. The method according to claim 1, further comprising the step of:
    supplying voltage that is adjustable in its amplitude but of essentially constant frequency with the soft starter to the drive machinery of the conveyor from an alternating electricity source in a changeover situation of the supply device.

7. The method according to claim 1, further comprising the step of:
    changing the supply device when it is estimated that the power requirement of the conveyor will increase to be larger than the permitted power-handling capacity of the inverter.

8. The method according to claim 7, further comprising the step of:
    gradually increasing the amplitude at the fundamental frequency of the voltage to be supplied with the soft starter in connection with a change of the supply device.

9. The method according to claim 1, further comprising the step of:
    changing the supply device after the power requirement of the conveyor has decreased to be in accordance with the permitted power-handling capacity of the inverter.

10. The method according to claim 1, further comprising the step of:
    before a change of a supply device, increasing the frequency of the inverter voltage to be essentially the same as the frequency of the alternating electricity source.

11. The method according to claim 1, further comprising the step of:
    supplying voltage to the drive machinery of the conveyor with the soft starter when the power requirement of the conveyor is greater than the upper limit of the permitted power-handling capacity of the inverter.

12. The method according to claim 1, wherein the inverter is a three-phase inverter, the soft starter is a three-phase soft starter, and the three-phase inverter and the three-phase soft starter are configured being independent of each other.

13. A conveyor system, comprising:
    drive machinery for driving the conveyor;
    at least two different, adjustable supply devices, fitted to supply electric power at different times to the drive machinery of the conveyor, the at least two different, adjustable supply devices including an inverter and a soft starter; and
    a control device, which is configured to form a control signal for changing the supply device to supply power to the drive machinery on the basis of the power requirement of the conveyor,
    wherein the inverter is configured to supply electric power to drive machinery of the conveyor during a first period, and the soft starter is configured to supply electric power to drive machinery of the conveyor during a second period, a power requirement of the conveyor during the first period being smaller than a power requirement of the conveyor during the second period.

14. The conveyor system according to claim 13, wherein the conveyor system comprises a device configured to estimate the power requirement of the conveyor; and the control device is configured to form a control signal for changing the supply device supplying power to the drive machinery on the basis of the estimate made of the power requirement of the conveyor.

15. The conveyor system according to claim 13, wherein the at least two different adjustable supply devices, are arranged to adjust the amplitudes of the voltages they supply in the changeover situation of the supply device.

16. The conveyor system according to claim 13, wherein the at least two different adjustable supply devices, are arranged to adjust the amplitudes at the fundamental frequencies of the voltages they supply in the changeover situation of the supply device to be essentially equal.

17. The conveyor system according to claim 13, wherein the inverter is configured for which an upper limit for the permitted power-handling capacity is defined; and the inverter is fitted between the alternating electricity source and the supply leads of the drive machinery.

18. The conveyor system according to claim 17, wherein the inverter is fitted to supply voltage to the supply leads of the drive machinery of the conveyor, the amplitude and frequency of the fundamental frequency of which voltage are adjustable.

19. The conveyor system according to claim 17, wherein the soft starter comprises thyristors fitted between the alternating electricity source and the drive machinery such that at least one thyristor is connected in series between a phase of the alternating electricity source and a phase conductor of the drive machinery.

20. The conveyor system according to claim 13, wherein the soft starter is fitted between the alternating electricity source and the supply leads of the drive machinery.

21. The conveyor system according to claim 20, wherein the soft starter is fitted in parallel with the inverter to form between the alternating electricity source and the supply leads of the drive machinery a second current pathway in parallel with the current pathway of the inverter.

22. The conveyor system according to claim 20, wherein the control device is configured to form a control signal for changing the supply device supplying power to the drive machinery from the inverter to the soft starter, or from the soft starter to the inverter, on the basis of the estimate made of the power requirement of the conveyor.

23. The conveyor system according to claim 20, wherein the control device is configured to form a control signal for changing the supply device supplying power to the drive machinery from the inverter to the soft starter when it is estimated that the power requirement of the conveyor will increase to be larger than the permitted power-handling capacity of the inverter.

24. The conveyor system according to claim 23, wherein the soft starter is configured to gradually increase the amplitude of the voltage to be supplied with the soft starter in connection with a change of the supply device.

25. The conveyor system according to claim 20, wherein the control device is configured to form a control signal for changing the supply device supplying power to the drive machinery from the soft starter to the inverter after the power requirement of the conveyor has decreased to be according to the permitted power-handling capacity of the inverter.

26. The conveyor system according to claim 13, wherein the inverter is a three-phase inverter, the soft starter is a three-phase soft starter, and the three-phase inverter and the three-phase soft starter are configured being independent of each other.

* * * * *